E. A. McKOY AND G. D. MOORE.

METHOD OF HARVESTING STUMPS.

APPLICATION FILED MAY 20, 1921.

Reissued June 27, 1922.

15,394.

2 SHEETS—SHEET 1.

INVENTORS,
Edwin A. McKoy,
and George D. Moore,
Prentiss, Stone & Boyden
ATTORNEYS.

E. A. McKOY AND G. D. MOORE.

METHOD OF HARVESTING STUMPS.

APPLICATION FILED MAY 20, 1921.

Reissued June 27, 1922.

15,394.

2 SHEETS—SHEET 2.

INVENTORS,
Edwin A. McKoy
and George D. Moore,
Prentiss, Stone & Boyden
ATTORNEYS.

UNITED STATES PATENT OFFICE.

EDWIN A. McKOY AND GEORGE D. MOORE, OF NEW ORLEANS, LOUISIANA.

METHOD OF HARVESTING STUMPS.

15,394. Specification of Reissued Letters Patent. Reissued June 27, 1922.

Original application filed September 21, 1917, Serial No. 192,567. Renewed July 9, 1919, Serial No. 309,767. Original No. 1,313,709, dated August 19, 1919. Application for reissue filed May 20, 1921. Serial No. 471,257.

*To all whom it may concern:*

Be it known that we, EDWIN A. McKOY and GEORGE D. MOORE, citizens of the United States of America, and residents of New Orleans, in the parish of Orleans and State of Louisiana, have invented certain new and useful Improvements in Methods of Harvesting Stumps, of which the following is a specification.

This invention relates to a method of harvesting stumps and has for an object to provide a method of disintegrating standing stumps and conserving the disintegrated material for further use in the arts.

It has heretofore been proposed to disintegrate standing stumps by means of a rotary cutter, but in such prior attempts, the chips or cuttings were allowed to fly in all directions from the cutter, and become scattered and lost. Our present improved method comprises the important and novel step of confining and directing the chips or cuttings so that they may be collected and conserved for subsequent chemical or other treatment.

In carrying forward the present invention a great variety of mechanical appliances can be employed. In a co-pending application, Serial No. 471,259, filed by these applicants, coincidentally herewith, for the reissue of their Patent No. 1,313,708, is disclosed a mechanism which can be employed in carrying out the present process although the present process or method is not confined to the use of such specific mechanism. For the purpose of illustrating one of the means for carrying into effect this method, the mechanism which forms the subject matter of the above identified co-pending application, is illustrated again herewith.

Figure 1:
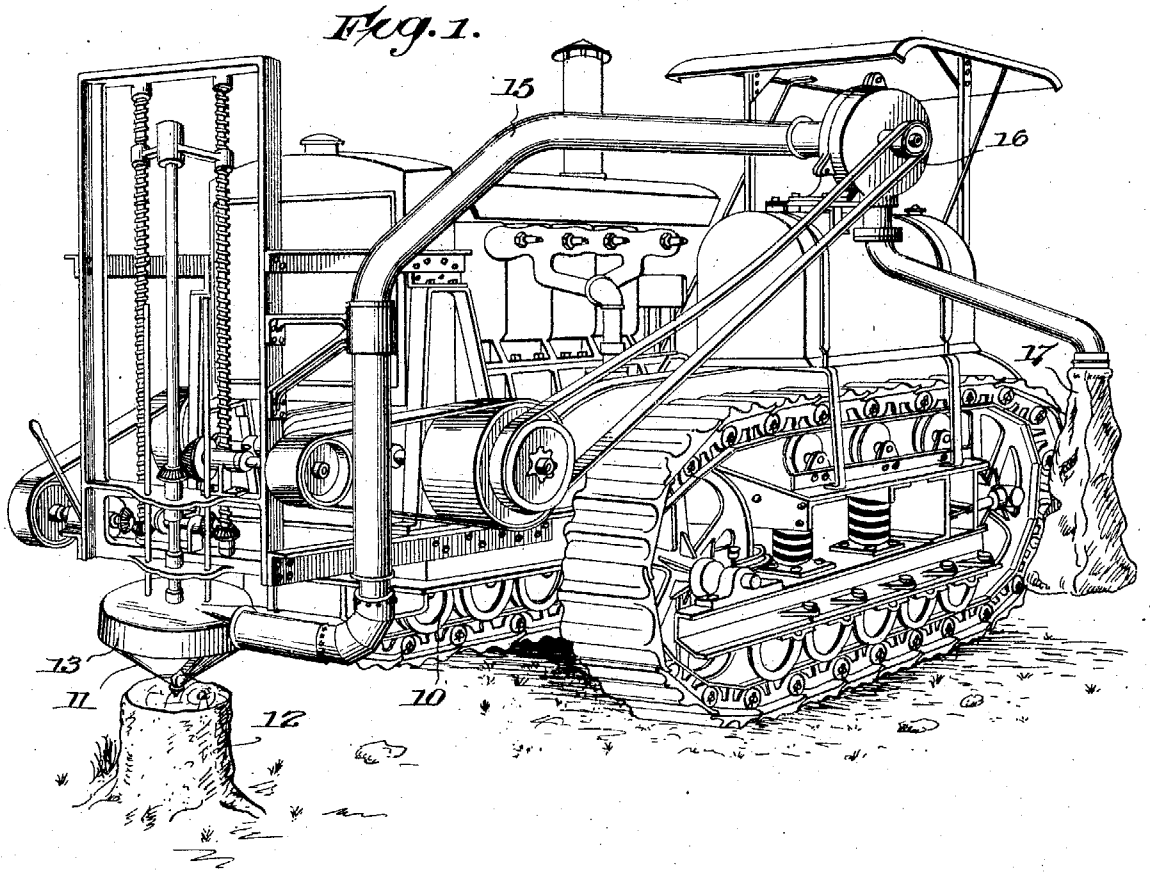
Figure 1 is a perspective view of the improved mechanism mounted upon a dirigible power plant of the type ordinarily known as a caterpillar tractor.
Figure 2:
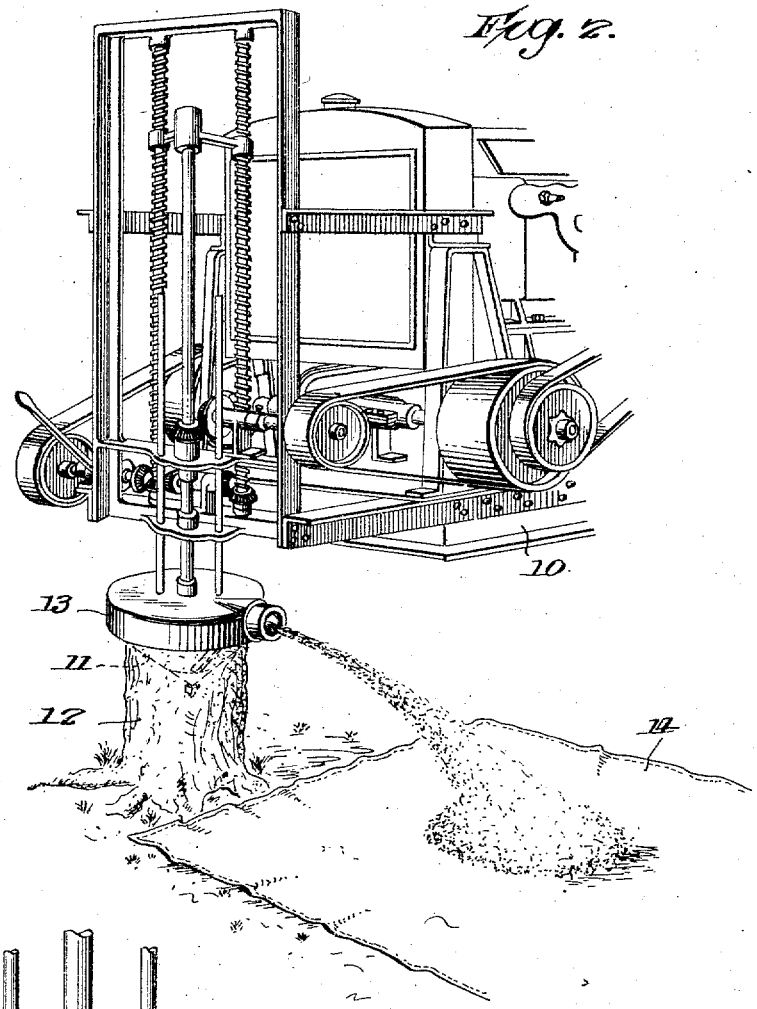
Figure 2 is a perspective view of the invention disclosing a different manner of conserving the cuttings from the boring tool.
Figure 3:
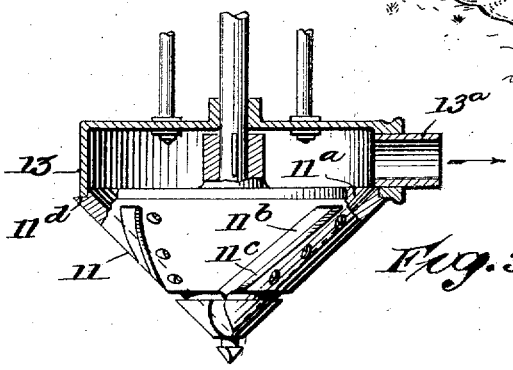
Figure 3 is a view, partly in side elevation and partly in diametrical section, of the boring tool and housing therefor.

As disclosed in said co-pending application, the device there illustrated comprises a power plant mounted upon a dirigible vehicle or tractor, here indicated as a whole at 10. The disintegrating mechanism comprises a boring tool or cutter head 11 driven from the dirigible power plant by mechanism which will rotate the boring tool and at the same time move it vertically into engagement with the stump disclosed at 12. This tool or cutter head is in the form of a solid of revolution usually of a diameter at least as large as the diameter of the stump to be harvested, but where the stump is extraordinarily large, this is not practical, and is preferably of hollow construction, being provided with knives arranged to deliver inwardly into the hollow of the head. By way of example, the cutter head 11 illustrated in the drawings, is shown as in the form of an inverted cone, having a hollow interior, as indicated at $11^a$, and provided with slots or openings $11^b$ in its conical wall. In these openings are set knives $11^c$, arranged with their cutting edges projecting slightly beyond the working face, so that the cuttings or chips from said knives pass inwardly through the openings $11^b$ into the interior of the head. As shown in Fig. 3, the upper end of the cutter head is open, and over this open end is disposed a housing 13, with its lower edge engaging a groove $11^d$ formed around the base of the conical cutter head. It will be understood, that, as fully explained, in the above identified co-pending application, the housing 13 is held against rotation, but travels with the cutter head in its vertical movement. From a suitable outlet $13^a$, of the housing, the disintegrated material may be discharged directly to any convenient receptacle as the sheet 14 (as shown at Fig. 2), or through a conduit 15 and exhaust mechanism 16, to a receptacle such as the bag 17.

In operation, the dirigible vehicle or tractor is manipulated so as to bring the boring or cutting tool or head into proper position immediately above a stump to be harvested. If, as is usually the case, the stump is no larger than the diameter of the cutter head, such head is approximately centered relative to the stump. If the stump is exceptionally large, it may be necessary to position the cutter head at one side of the center, but, in any event, the cutter head is properly positioned, and, then, while being continuously rotated by the power plant, is lowered into engagement with the stump. The advancing of the cutting tool downwardly and its simultaneous rotation will serve to cut away and disintegrate the stump 12, cutting the material up substantially across the grain into small particles of granular appearance similar in general appearance to sawdust. In many parts of the country there are standing stumps containing valuable ingredients which can be extracted from the material chemically or by heat, as for instance, the standing stumps of former turpentine forests, which contain very large percentages of turpentine and rosin, which can be extracted from the disintegrated material. The grinding, cutting or disintegrating of the stumps, not only conserves the material of the stumps but simultaneously removes the stump from the land, rendering the land more valuable. In efforts heretofore made for cutting away or grinding standing stumps no provision has been made for conserving the cut material, and the present invention relates to the conserving of such material for further action or utilization. The utilization of the material disintegrated from the stumps will form the subject matter of other and further applications.

We claim:—

1. The process of harvesting stumps which comprises, providing a hollow conical cutter head having knives arranged to deliver inwardly into the hollow of the head and of a diameter approximately as large at least as the diameter to be harvested and applying said head to the upper end of a stump and forcing it downwardly therein while rotating the head.

2. The process of harvesting stumps which comprises, providing a hollow conical cutter head having knives arranged to deliver inwardly into the hollow of the head and of a diameter approximately as large as the diameter to be harvested, providing a housing to receive the cuttings from the interior of the head and deliver them to a pre-determined depository and applying said head to the upper end of a stump and forcing it downwardly while rotating the head and holding the housing from rotation.

3. The process of harvesting stumps which comprises, providing a cutter head of a diameter approximately as large as the diameter to be harvested, with a housing about said cutter head, said cutter head arranged to deliver the cuttings into the housing, and the housing arranged to deliver the cuttings to a predetermined depository and applying the said head to the upper end of a stump and forcing the cutter and housing downwardly while rotating the cutter head and holding the housing against rotation.

4. The process of harvesting stumps which comprises, providing a hollow cutter head having knives upon its exterior arranged to deliver cuttings inwardly into the hollow of the head and of a diameter approximately as large as the diameter to be harvested and applying said head to the upper end of a stump and forcing it downwardly therein while rotating the head.

5. The process of harvesting stumps which comprises, providing a hollow cutter head having knives arranged to deliver cuttings into the hollow of the head, and of a diameter approximately as large as the diameter to be harvested, providing a housing to receive the cuttings from the interior of the head and deliver them to a pre-determined depository and applying said head to the upper end of a stump and forcing it downwardly therein while rotating the head.

6. The process of harvesting stumps which comprises, providing a hollow cutter head of a diameter approximately as large as the diameter to be harvested, with a housing about said cutter head, said cutter head arranged to deliver the cuttings into the housing and the housing arranged to deliver the cuttings to a predetermined depository and applying the said head to the upper end of a stump and forcing the cutter and housing downwardly while rotating the cutter head and holding the housing against rotation.

7. The herein described method of harvesting stumps which consists in progressively cutting away the stump by means of a rotary cutter, and confining and directing the cuttings to a definite receptacle.

8. The herein described method of harvesting stumps which consists in progressively disintegrating the stump from the top downward, and confining and collecting the disintegrated material.

9. The herein described method of harvesting stumps which consists in progressively disintegrating the stump by means of a rotary cutter, confining the disintegrated material as it is thrown off by such cutter, and continuously directing it to a receptacle.

10. The herein described method of harvesting stumps which consists in progressively cutting away the stump across the grain by means of a rotary cutter, and concentrating and directing the flow of chips thrown off by such cutter.

In testimony whereof we affix our signatures.

EDWIN A. McKOY.
GEORGE D. MOORE.